United States Patent
Watanabe et al.

(10) Patent No.: US 7,265,072 B2
(45) Date of Patent: *Sep. 4, 2007

(54) DIELECTRIC CERAMIC COMPOSITION AND ELECTRONIC DEVICE

(75) Inventors: Yasuo Watanabe, Chuo-ku (JP); Wataru Takahara, Chuo-ku (JP)

(73) Assignee: TDK Corporation, Tokyo (JP)

( * ) Notice: Subject to any disclaimer, the term of this patent is extended or adjusted under 35 U.S.C. 154(b) by 94 days.

This patent is subject to a terminal disclaimer.

(21) Appl. No.: 10/545,586

(22) PCT Filed: Feb. 17, 2004

(86) PCT No.: PCT/JP2004/001711

§ 371 (c)(1), (2), (4) Date: Aug. 16, 2005

(87) PCT Pub. No.: WO2004/071992

PCT Pub. Date: Aug. 26, 2004

(65) Prior Publication Data

US 2006/0234854 A1 Oct. 19, 2006

(30) Foreign Application Priority Data

Feb. 17, 2003 (JP) ............................. 2003-038778

(51) Int. Cl.
- C04B 35/465 (2006.01)
- C04B 35/47 (2006.01)
- H01G 4/06 (2006.01)
- C04B 35/468 (2006.01)

(52) U.S. Cl. ..................... 501/136; 501/138; 501/139; 361/321.4; 361/321.5

(58) Field of Classification Search ................ 501/135, 501/136, 137, 138, 139; 361/321.4, 321.5
See application file for complete search history.

(56) References Cited

U.S. PATENT DOCUMENTS 6,485,672 B1 11/2002 Nomura et al.
7,157,396 B2 * 1/2007 Watanabe et al. ........... 501/135

FOREIGN PATENT DOCUMENTS

| EP | 1 096 518 A1 | 2/2000 |
| JP | A 57-37081 | 3/1982 |
| JP | A 60-131708 | 7/1985 |
| JP | A 63-126117 | 5/1988 |
| JP | A 11-224827 | 8/1999 |
| JP | B2 2997236 | 10/1999 |
| JP | A 11-302072 | 11/1999 |

(Continued)

Primary Examiner—Karl Group
(74) Attorney, Agent, or Firm—Oliff & Berridge, PLC

(57) ABSTRACT

A dielectric ceramic composition includes a main component including a dielectric oxide expressed by a composition formula of $\{(Ca_{1-x}Sr_x)O\}_m \cdot (Zr_{1-y}Ti_y)O_2$, wherein m, x and y indicating composition mole ratios in the composition formula are in relationships of $0.8 \leq m \leq 1.3$, $0 \leq x \leq 1.00$ and $0.1 \leq y \leq 0.8$; a first subcomponent including a V oxide; and a second subcomponent including an Al oxide; wherein ratios of respective components with respect to 100 moles of said main component are the first subcomponent: 0 mole<first subcomponent<7 moles (wherein the value is a V oxide value in terms of $V_2O_5$); and the second subcomponent: 0 mole<second subcomponent<15 moles (wherein the value is an Al oxide value in terms of $Al_2O_3$).

7 Claims, 1 Drawing Sheet

FOREIGN PATENT DOCUMENTS

| | | |
|---|---|---|
| JP | A 2000-311828 | 11/2000 |
| JP | A 2001-220229 | 8/2001 |
| JP | A 2001-294481 | 10/2001 |
| JP | A 2002-80278 | 3/2002 |
| JP | A 2002-338343 | 11/2002 |
| JP | A 2003-246672 | 9/2003 |
| JP | A 2003-286079 | 10/2003 |
| WO | WO 00/51147 | 8/2000 |
| WO | WO 02/00568 A1 | 1/2002 |

\* cited by examiner

DIELECTRIC CERAMIC COMPOSITION AND ELECTRONIC DEVICE

TECHNICAL FIELD

The present invention relates to a dielectric ceramic composition, for example, used as a dielectric layer of a multilayer ceramic capacitor and an electronic device using the dielectric ceramic composition as a dielectric layer thereof.

BACKGROUND ART

A multilayer ceramic capacitor as an example of an electronic device has a capacitor element body, wherein a plurality of dielectric layers composed of a dielectric ceramic composition having a predetermined composition and a plurality of internal electrode layers including a variety of metals as its main component are alternately stacked. This kind of a multilayer ceramic capacitor is normally formed by printing a conductive paste on a green sheet made by a dielectric ceramic composition, stacking the plurality of green sheets printed with the conductive paste and firing the green sheets and internal electrode layers as one body.

In recent years, to use inexpensive base metals (for example, nickel and copper, etc.) as an internal electrode material, a variety of proposals have been made on dielectric ceramic compositions (for example, refer to the patent articles 1 to 4).

However, in any of the dielectric ceramic compositions, there were disadvantages that dielectric characteristics (capacity change, a dielectric loss) declined at a low frequency after firing or the accelerated lifetime of insulation resistance after firing became short in some cases. Therefore, when producing a multilayer ceramic capacitor having internal electrodes made by nickel or other base metal by using the dielectric ceramic composition, reliability of a multilayer ceramic capacitor to be obtained was liable to decline.

Thus, there have been made a variety of proposals to improve an accelerated lifetime of insulation resistance of a dielectric ceramic composition to improve reliability of a multilayer ceramic capacitor using the dielectric ceramic composition (for example, refer to the patent articles 5 to 7).

The patent article 5 discloses a dielectric ceramic composition including a dielectric oxide having a composition expressed by $(Ca_{1-x} Sr_x)_m \cdot (Zr_{1-y} Ti_y)O_3$ as a main component (note that $0.94 \leq m < 1.08$, $0 \leq x \leq 1.00$ and $0.8 \leq y \leq 1.00$), at least one kind of oxides of V, Nb, W, Ta and Mo by an amount of 0.01 to 2 moles (note that 2 moles is excluded), $MnO_2$ by an amount of less than 4 moles and at least one kind of $SiO_2$, MO (note that M is at least one kind of element selected from Ba, Ca, Sr and Mg), $Li_2O$ and $B_2O_3$ by an amount of less than 15 moles with respect to 100 moles of the main component.

The patent article 6 discloses a dielectric ceramic composition including a dielectric oxide having a composition expressed by $(Ca_{1-x} Sr_x)_m \cdot (Zr_{1-y} Ti_y)O_3$ as a main component (note that $0.75 \leq m \leq 1.04$, $0 \leq x \leq 1.00$ and $0 \leq y \leq 0.1$), at least one kind of oxides of Nb, W, Ta and Mo except for V, $Al_2O_3$ by an amount of 0.1 to 10 moles, $MnO_2$ by an amount of 0.2 to 5 moles, and a composite oxide of Ba, Ca, Si and O by an amount of 0.5 to 15 moles with respect to 100 moles of the main component.

The patent article 7 discloses a dielectric ceramic composition including a dielectric oxide having a composition expressed by $(Ca_{1-x} Sr_x)_m \cdot (Zr_{1-y} Ti_y)O_3$ as a main component (note that $0.8 \leq m \leq 1.3$, $0 \leq x \leq 1.00$ and $0.1 \leq y \leq 0.8$), at least one kind of oxides of V, Nb, W, Ta and Mo by an amount of 0.01 to 5 moles, $MnO_2$ by an amount of 0.2 to 5 moles, at least one kind of $SiO_2$, MO (note that M is at least one kind of element selected from Ba, Ca, Sr and Mg), $Li_2O$ and $B_2O_3$ by an amount of less than 15 moles with respect to 100 moles of the main component.

However, still, a sufficient accelerated lifetime of insulation resistance may not be obtained in the dielectric ceramic compositions described in the patent articles 5 to 7. As a result, when producing a multilayer ceramic capacitor having internal electrodes made by a base metal, such as nickel, by using the dielectric ceramic composition, reliability of the multilayer ceramic capacitor cannot be improved in some cases.

Patent Article 1: The Japanese Unexamined Patent Publication No. 11-224827

Patent Article 2: The Japanese Unexamined Patent Publication No. 60-131708

Patent Article 3: The Japanese Unexamined Patent Publication No. 57-37081

Patent Article 4: The Japanese Examined Patent Publication No. 63-126117

Patent Article 5: The Japanese Unexamined Patent Publication No. 2002-80278

Patent Article 6: The Japanese Patent Publication No. 2997236

Patent Article 7: The International Patent Publication No. WO02/00568

DISCLOSURE OF THE INVENTION

An object of the present invention is to provide a reduction-resistant dielectric ceramic composition having a further improved accelerated lifetime of insulation resistance while maintaining an excellent low frequency dielectric characteristic, and an electronic device, such as a chip capacitor, with further improved reliability including the dielectric ceramic composition.

To attain the above object, according to the present invention, there is provided a dielectric ceramic composition, comprising:

a main component including a dielectric oxide expressed by a composition formula of $\{(Ca_{1-x} Me_x)O\}_m \cdot (Zr_{1-y} Ti_y)O_2$, wherein "Me" indicating an element name in the composition formula is at least one of Sr, Mg and Ba, and "m", "x" and "y" indicating composition mole ratios in the composition formula are in relationships of $0.8 \leq m \leq 1.3$, $0 \leq x \leq 1.00$ and $0 \leq y \leq 1.00$;

a first subcomponent including a V oxide; and
a second subcomponent including an Al oxide;
wherein
ratios of respective components with respect to 100 moles of the main component are
the first subcomponent: 0 mole<first subcomponent<7 moles (wherein the value is a V oxide value in terms of $V_2O_5$); and
the second subcomponent: 0 mole<second subcomponent<15 moles (wherein the value is an Al oxide value in terms of $Al_2O_3$).

Preferably, a third subcomponent including a Mn oxide is included, and a ratio of the third subcomponent with respect to 100 moles of the main component is 0 mole <third subcomponent<5 moles in terms of a Mn element in the oxide.

Preferably, a fourth subcomponent including $SiO_2$ as a main component and at least one kind selected from MO (note that M is at least one kind of element selected from Ba, Ca, Sr and Mg), $Li_2O$ and $B_2O_3$ (more preferably, a composite oxide expressed by a composition formula of $\{(Ba_z, Ca_{1-z})O\}_v \cdot SiO_2$, wherein "z" and "v" indicating composition mole ratios in the composition formula are in relationships of $0 \leq z \leq 1$ and $0.5 \leq v \leq 4.0$) is included, and a ratio of the fourth subcomponent is 0 mole<fourth subcomponent<20 moles in terms of the oxide.

According to the present invention, there is provided a dielectric ceramic composition, comprising:

a main component including a dielectric oxide expressed by a composition formula of $\{(Ca_{1-x} Me_x)O\}_m \cdot (Zr_{1-y} Ti_y)O_2$, wherein "Me" indicating an element name in the composition formula is at least one of Sr, Mg and Ba, and "m", "x" and "y" indicating composition mole ratios in the composition formula are in relationships of $0.8 \leq m \leq 1.3$, $0 \leq x \leq 1.00$ and $0 \leq y \leq 1.00$;

a first subcomponent including a V oxide;

a second subcomponent including an Al oxide;

a third subcomponent including a Mn oxide; and a fourth subcomponent including a composite oxide expressed by a composition formula of $\{(Ba_z, Ca_{1-z})O\}_v \cdot SiO_2$, wherein "z" and "v" indicating composition mole ratios in the composition formula are in relationships of $0 \leq z \leq 1$ and $0.5 \leq v \leq 4.0$;

wherein ratios of respective components with respect to 100 moles of the main component are:

the first subcomponent: 0 mole<first subcomponent<7 moles (wherein the value is a V oxide value in terms of $V_2O_5$);

the second subcomponent: 0 mole<second subcomponent<15 moles (wherein the value is an Al oxide value in terms of $Al_2O_3$);

the third subcomponent: 0 mole<third subcomponent<5 moles (wherein the value is in terms of a Mn element in the oxide); and the fourth subcomponent: 0 mole<fourth subcomponent<20 moles (wherein the value is in terms of the composite oxide).

An electronic device according to the present invention is not particularly limited as far as it has a dielectric layer and is, for example, a multilayer ceramic capacitor having an element body formed by alternately stacked internal electrode layers and dielectric layers. In the present invention, the dielectric layer is composed of any one of the above dielectric ceramic compositions. A conductive material included in the internal electrode layer is not particularly limited and, for example, Ni, a Ni alloy and other base metals may be mentioned.

EFFECT OF THE INVENTION

The present inventors have been committed themselves to study for furthermore improving an accelerated lifetime of insulation resistance (=high temperature load lifetime: It will be simply referred to as "a lifetime" in explanations below.) of a reduction-resistant dielectric ceramic composition. As a result, they found that the lifetime can be widely improved in a dielectric ceramic composition including at least a V oxide and an Al oxide (preferably, a Mn oxide and a specific sintering auxiliary agent are furthermore included) at a specific ratio in a dielectric oxide having a specific composition comparing with that in dielectric ceramic compositions having compositions of the related art. A factor of bringing the effect of improving the lifetime is not completely clear, but it is considered that a synergistic effect of a V oxide and an Al oxide is the factor. Also, it was found that reliability can be widely improved in an electronic device obtained by using the dielectric ceramic composition having a widely improved lifetime.

Namely, in the dielectric ceramic composition according to the present invention, as a result that at least a specific first subcomponent and second subcomponent are included by predetermined amounts in a dielectric oxide having a specific composition, reduction resistance at firing becomes excellent, a capacity-temperature characteristic after firing becomes excellent, low frequency dielectric dispersion (for example, a dielectric loss at 160° C. and 100 Hz) can be suppressed and an accelerated lifetime of insulation resistance (high temperature load lifetime) can be widely improved comparing with those in the case, where the first subcomponent and the second subcomponent are not included by suitable amounts.

In an electronic device, such as a chip capacitor, according to the present invention, since dielectric layers composed of the dielectric ceramic composition (preferably, the above explained dielectric ceramic composition produced by the method of the present invention) according to the present invention are provided, an excellent capacity-temperature characteristic is obtained, low frequency dielectric dispersion is suppressed, and the accelerated lifetime of insulation resistance (high temperature load lifetime) is improved, consequently, reliability of the electronic device is widely improved.

The electronic device is not particularly limited and a ceramic capacitor, a multilayer ceramic capacitor, a chip varistor, and other surface mounted chip type electronic devices (SMD) may be mentioned.

Figure 1:
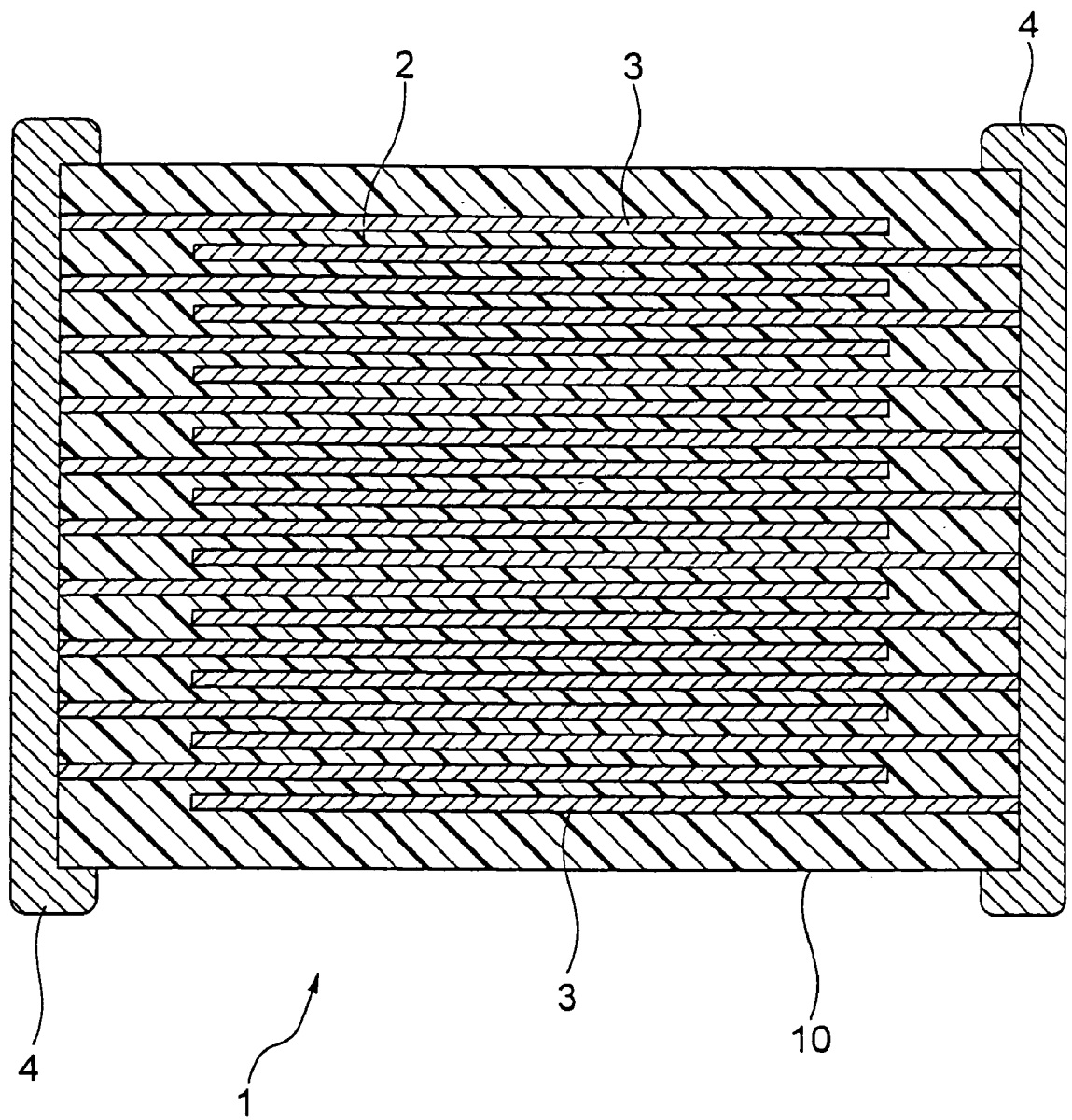
FIG. 1 is a sectional view of a multilayer ceramic capacitor according to an embodiment of the present invention.

Reference numbers in FIG. 1 are as follows. 1 . . . multilayer ceramic capacitor, 10 . . . capacitor element body, 2 . . . dielectric layer, 3 . . . internal electrode layer, 4 . . . external electrode

BEST MODE FOR CARRYING OUT THE INVENTION

Below, the present invention will be explained based on an embodiment shown in the drawings.

Multilayer Ceramic Capacitor

As shown in FIG. 1, a multilayer ceramic capacitor 1 according to an embodiment of the present invention comprises a capacitor element body 10, wherein a plurality of dielectric layers 2 and internal electrode layers 3 are alternately stacked. At both end portions of the capacitor element body 10, a pair of external electrodes 4 connected respectively to the alternately arranged internal electrode layers 3 inside the element body 10 are formed. A shape of the capacitor element body 10 is not particularly limited and is normally a rectangular parallelepiped shape. A size thereof is not particularly limited and may be a suitable size in accordance with the use object, but is normally (0.4 to 5.6 mm)×(0.2 to 5.0 mm)×(0.2 to 1.9 mm) or so.

The internal electrode layers 3 are stacked, so that the respective end surfaces are alternately exposed to surfaces of facing two end portions of the capacitor element body 10. The pair of external electrodes 4 are formed at both end portions of the capacitor element body 10 and connected to the exposed end surfaces of the alternately arranged internal electrode layers 3 so as to compose a capacitor circuit.

The dielectric layer 2 includes a dielectric ceramic composition of the present invention.

A dielectric ceramic composition of the present invention comprises at least a main component including a dielectric oxide expressed by a composition formula of $\{(Ca_{1-x} Me_x)O\}_m \cdot (Zr_{1-y} Ti_y)O_2$;

a first subcomponent including a V oxide; and a second subcomponent including an Al oxide. In this case, an oxygen (O) amount may be a little deviated from the stoichiometric composition of the above formula.

In the above formula, "x" satisfies $0 \leq x \leq 1.00$ and expresses the number of atoms of "Me" (Note that Me is at least one of Sr, Mg and Ba. Sr is preferable among them.). By changing "x", that is the Me/Ca ratio, a phase transition point of crystal can be freely shifted. Therefore, the capacity-temperature coefficient and specific permittivity can be freely controlled. Note that, in the present invention, the ratio of Ca and Me may be any, and only one of them may be included.

In the above formula, "y" satisfies $0 \leq y \leq 1.00$, preferably $0 \leq y \leq 0.8$, and particularly preferably $0.1 \leq y \leq 0.8$. The "y" expresses the number of atoms of Ti. By substituting by $ZrO_2$, which is hard to be reduced comparing with $TiO_2$, the reduction resistance tends to furthermore improve.

In the above formula, "m" satisfies $0.8 \leq m \leq 1.3$, and preferably $0.970 \leq m \leq 1.030$. When the "m" is 0.8 or larger, formation of semiconductor is prevented at firing in a reducing atmosphere, while when the "m" is 1.3 or smaller, a dense sintered body can be obtained without heightening the firing temperature.

Different points in the dielectric ceramic composition of the present invention from dielectric ceramic compositions of the related art are that "y" is particularly preferably in a range of $0.1 \leq y \leq 0.8$, and a first subcomponent including a V oxide and a second subcomponent including an Al oxide are added by predetermined amounts. As a result that at least the first subcomponent and second subcomponent are included by predetermined amounts, low temperature firing becomes possible without deteriorating the dielectric characteristics when the "y" in the main component is in a range of $0.1 \leq y \leq 0.8$, the lifetime can be widely improved even in the case where the dielectric layers are made thin, furthermore, reliability as a capacitor can be widely improved.

The first subcomponent has a function of improving a high temperature load lifetime. The second subcomponent has a function of lowering the firing temperature and improving the high temperature load lifetime.

The ratio of the first subcomponent with respect to 100 moles of the main component is 0 mole<first subcomponent<7 moles, and preferably 0.01 mole$\leq$first subcomponent$\leq$5 moles in terms of $V_2O_5$. The ratio of the second subcomponent with respect to 100 moles of the main component is 0 mole<second subcomponent<15 moles, and preferably 0.01 mole$\leq$second subcomponent$\leq$10 moles in terms of $Al_2O_3$. As a result that the first subcomponent and the second subcomponent are included by predetermined amounts, low temperature firing without deteriorating the dielectric characteristics becomes possible when "y" in the main component is in the preferable range of $0.1 \leq y \leq 0.8$, the lifetime is widely improved even in the case where the dielectric layers are made thin, furthermore, reliability as a capacitor can be widely improved.

Note that a part of a V oxide included in the first subcomponent may be substituted by oxides of group V elements, such as Nb and Ta, and oxides of group IV elements, such as Cr, Mo and W.

The dielectric ceramic composition of the present invention is preferably further added a third subcomponent including a Mn oxide. The third subcomponent gives an effect of accelerating sintering and an effect of improving the lifetime, moreover, an effect of declining the defective rate of initial insulation resistance when the dielectric layer 2 is made as thin as, for example, 4 μm or so.

When adding the third subcomponent, the ratio with respect to 100 moles of the above main component is preferably 0 mole<third subcomponent<5 moles, and more preferably 0.1 mole$\leq$third subcomponent$\leq$4 moles in terms of a Mn element in the oxide. When the adding quantity of the third subcomponent is too much, it is liable that the initial insulation resistance cannot be obtained. When the adding quantity of the third subcomponent is in a range of 0 mole<third subcomponent <5 moles, the larger the adding quantity, the more contributable to an improvement of the lifetime and a reduction of the initial IR defective rate; and the smaller the adding quantity is, the smaller the capacity-temperature change rate can be made.

The dielectric ceramic composition of the present invention is preferably further added a fourth subcomponent including $SiO_2$ as the main component and at least one kind selected from MO (note that M is at least one kind of element selected from Ba, Ca, Sr and Mg), $Li_2O$ and $B_2O_3$. The fourth subcomponent works mainly as a sintering auxiliary agent and also gives an effect of improving the defective rate of the initial insulation resistance (IR) when the dielectric layer 2 is made thin.

Preferably, the fourth subcomponent includes a composite oxide expressed by a composition formula of $\{(Ba_z, Ca_{1-z})O\}_v \cdot SiO_2$ (hereinafter, also referred to as BCG). The composite oxide $\{(Ba_z, Ca_{1-z})O\}_v \cdot SiO_2$ has a low melting point, so that it has preferable reactivity with the main component. In the composition formula $\{(Ba_z, Ca_{1-z})O\}_v \cdot SiO_2$ as a preferable form of the fourth subcomponent, "v" indicating the composition mole ratio in the composition formula is preferably $0.5 \leq v \leq 4.0$, and more preferably $0.5 \leq v \leq 2.0$. When the "v" is too small, that is, when $SiO_2$ is too much, it reacts with the main component and deteriorates the dielectric characteristics. On the other hand, when the "v" is too large, the melting point becomes high and sinterability is declined, which is not preferable. Note that "z" indicating the composition mole ratio of Ba and Ca may be any ($0 \leq z \leq 1$), and only one of the two may be included, but $0.3 \leq z \leq 0.7$ is preferable.

When adding the fourth subcomponent, the ratio with respect to 100 moles of the main component is preferably 0 mole<fourth subcomponent<20 moles, and more preferably 0.1 mole$\leq$fourth subcomponent$\leq$15 moles. By adding the fourth subcomponent even by a small amount, it becomes effective to decline the initial IR defective rate, and when added by less than 20 moles, a decline of the specific permittivity can be suppressed and a sufficient capacity can be secured.

The dielectric ceramic composition of the present invention may further include a fifth subcomponent including an oxide of R (note that R is at least one element of Sc, Y, La, Ce, Pr, Nd, Pm, Sm, Eu, Gd, Tb, Dy, Ho, Er, Tm, Yb and Lu).

The number of stacked layers, a thickness and other condition of the dielectric layer 2 may be suitably determined in accordance with the object and the use. Also, the dielectric layer 2 is composed of grains (dielectric particles) and grain boundary phases. An average particle diameter of the grains of the dielectric layer 2 is not particularly limited in the present invention, but is preferably 0.1 to 5 μm or so.

The grain boundary phase of the dielectric layer 2 normally comprises oxides of materials composing a dielectric material or an internal electrode material, oxides of separately added materials and oxides of materials to be mixed as impurities in the procedure, and is normally composed of glass or a vitreous material.

A conductive material included in the internal electrode layer 3 is not particularly limited, but since the components of the dielectric layer 2 has reduction resistance, a base metal can be used. As a base metal to be used as the conductive material, Ni or a Ni alloy is preferable. As the Ni alloy, an alloy of one or more kind of elements selected from Mn, Cr, Co and Al with Ni is preferable, and a Ni content in the alloy is preferably 95 wt % or more. Note that Ni or a Ni alloy may include a variety of trace components, such as P, Fe and Mg, by not more than 0.1 wt % or so. A thickness of the internal electrode layer may be suitably determined, but is normally 0.3 to 3 µm, and particularly preferably 0.5 to 2 µm or so.

A conductive material included in the external electrodes 4 is not particularly limited, but Cu, a Cu alloy, Ni and a Ni alloy, etc. are normally used. Note that Ag and a Ag—Pd alloy, etc. may be naturally used. Note that, in the present embodiment, inexpensive Ni, Cu and alloys of these are used. A thickness of the external electrodes may be suitably determined in accordance with the use object, etc. but normally 5 to 50 µm or so is preferable.

Production Method of Multilayer Ceramic Capacitor

A multilayer ceramic capacitor 1 using the dielectric ceramic composition of the present invention is produced by preparing a green chip by a normal printing method or sheet method using a paste, firing the same, printing or transferring an external electrode thereon, and firing the result. Below, the production method will be explained in detail.

(1) First, a dielectric layer paste, internal electrode paste, and external electrode paste are produced, respectively.

When producing a dielectric layer paste, dielectric ceramic composition materials included therein are prepared first. The dielectric ceramic composition materials include a main component material and first to fourth subcomponent materials, etc.

As the main component material, a material expressed by the composition formula of $\{(Ca_{1-x}Me_x)O\}_m \cdot (Zr_{1-y}Ti_y)O_2$ is used. The main component material may be obtained by a so-called solid-phase method or a so-called liquid-phase method. The solid-phase method is, for example, when using $SrCO_3$, $CaCO_3$, $TiO_2$ and $ZrO_2$ as starting materials, a method of obtaining a material by weighing these to be predetermined amounts, mixing, preliminarily firing and pulverizing. As a liquid-phase synthesis method, an oxalate method, hydrothermal synthesis method and sol-gel method, etc. may be mentioned.

As the first subcomponent material, a V oxide and/or a compound to be a V oxide after firing is used. As the second subcomponent material, an Al oxide and/or a compound to be an Al oxide after firing is used. As the third subcomponent, a Mn oxide and/or a compound to be a Mn oxide after firing is used. As the fourth subcomponents, $SiO_2$, BaO, CaO, SrO, MgO, $Li_2O$, $B_2O_3$ and/or compounds, which become these oxides by being fired, are used.

The production method of the dielectric ceramic composition materials is not particularly limited in the present invention. For example, when producing the main component material, the above starting materials and first to fourth subcomponent materials, etc. may be mixed in advance, and when producing the main component material by the solid-phase method or liquid-phase method, etc., the dielectric ceramic composition materials may be obtained at the same time (adding first). Alternately, after producing the main component material by the solid-phase method or liquid-phase method first, the first to fourth subcomponent materials, etc. may be added to the main component material to obtain the dielectric ceramic composition materials (adding later).

Below, a method of mixing the first to fourth subcomponent materials when producing the main component material by the solid-phase method (for example, a preliminary firing method) to obtain the dielectric ceramic composition materials (adding first) will be explained as an example.

First, other than the starting materials (for example, $SrCO_3$, $CaCO_3$, $TiO_2$ and $ZrO_2$, etc.) for producing the main component material, at least a part of the final composition of the first subcomponent material (for example, $V_2O_5$), the second subcomponent material (for example, $Al_2O_3$), the third subcomponent material (for example, $MnCO_3$) and the fourth subcomponent material (for example, $(Ba, Ca)_z SiO_{2+z}$) are weighed to be predetermined amounts, mixed and dried to prepare materials before preliminary firing.

Next, the prepared powder before preliminary firing is subjected to preliminary firing. The preliminary firing condition is not particularly limited but the condition below is preferable. The temperature rising rate is preferably 50 to 400° C./hour, and more preferably 100 to 300° C./hour. The holding temperature is preferably 1000 to 1300° C. The temperature holding time is preferably 0.5 to 6 hours, and more preferably 1 to 3 hours. The processing atmosphere may be any of the air, nitrogen and reducing atmosphere.

The preliminarily fired powder is roughly pulverized by an alumina roll, etc. and added remaining additives (including the rest of the first to fourth subcomponents) in accordance with need, so that the final composition is attained. After that, the mixed powder is mixed by a ball mill, etc. in accordance with need and dried to obtain dielectric ceramic composition materials (powder) having the composition of the present invention.

Next, the dielectric ceramic composition materials are made to be slurry to fabricate a dielectric layer paste. The dielectric layer paste may be organic based slurry obtained by kneading the dielectric ceramic composition materials with an organic vehicle, or a water based slurry.

As the dielectric ceramic composition materials, the above explained oxides, mixture of these and composite oxides may be used, moreover, it is possible to suitably select from a variety of compounds to become the above oxides and composite oxides by being fired, such as carbonate, oxalate, nitrate, hydroxide and organic metal compound, and mix to use. Contents of respective compounds in the dielectric ceramic composition materials may be determined to obtain the composition of the dielectric ceramic composition explained above after firing.

An average particle diameter of the dielectric ceramic composition powder before made to be slurry is normally 0.1 to 3 µm or so.

The organic vehicle is obtained by dissolving a binder in an organic solvent. The binder used for the organic vehicle is not particularly limited and may be suitably selected from a variety of normal binders, such as ethyl cellulose, polyvinyl butyral. Also, an organic solvent to be used is not particularly limited and may be suitably selected from a variety of organic solvents, such as terpineol, butyl carbitol, acetone and toluene, in accordance with the use method, such as a printing method and sheet method.

When using water based slurry as the dielectric layer paste, a water based vehicle obtained by dissolving a water-soluble binder and dispersant, etc. in water may be kneaded with the dielectric materials. The water-soluble binder to be used for the water based vehicle is not particularly limited and, for example, polyvinyl alcohol, cellulose and a water-soluble acrylic resin, etc. may be used.

An internal electrode paste is fabricated by kneading a conductive material made by a variety of conductive metals and alloys or a variety of oxides to be the above conductive materials after firing, an organic metal compound, resinate, etc. with the above organic vehicle.

An external electrode paste is fabricated in the same way as the internal electrode paste.

(2) When using a printing method, the dielectric layer paste and internal electrode layer paste are stacked by printing on a substrate of polyethylene terephthalate, etc., cut to be a predetermined shape, and released from the substrate to obtain a green chip. On the other hand, when using a sheet method, the dielectric layer paste is used for forming a green sheet, the internal electrode layer paste is printed thereon, and the results are stacked to obtain a green chip.

(3) Next, binder removal processing and firing are performed on the green chip to obtain a chip sintered body. Then, annealing (thermal treatment) is performed to obtain a capacitor fired body.

(4) Next, the obtained capacitor fired body is subjected to end surface polishing, for example, by barrel polishing and sand-blast, etc., then, the terminal electrode paste is printed or transferred and fired to form terminal electrodes 4. Then, a cover layer (pad layer) is formed by soldering, etc. on a surface of the external electrodes 4 in accordance with need.

The ceramic capacitor 1 of the present embodiment produced as above is mounted on a print substrate by soldering, etc. to be used for a variety of electronic devices.

An embodiment of the present invention was explained above, but the present invention is not limited to the above embodiment and may be variously modified within the scope of the present invention.

For example, in the above embodiment, a multilayer ceramic capacitor was described as an example of the electronic device according to the present invention, but the electronic device according to the present invention is not limited to a multilayer ceramic capacitor and may be any as far as it includes a dielectric layer composed of a dielectric ceramic composition having the above composition.

EXAMPLES

Next, the present invention will be explained further in detail by further specific examples of the embodiment of the present invention. Note that the present invention is not limited to the examples.

In the examples, samples of a multilayer ceramic capacitor were produced by the steps described below.

Fabrication of Pastes

First, starting materials ($SrCO_3$, $CaCO_3$, $TiO_2$ and $ZrO_2$) having an average particle diameter of 0.1 to 1 µm respectively for producing the main component material and first to fourth subcomponent materials were prepared. In the present example, carbonate (the third subcomponent: $MnCO_3$) was used as a material of MnO and oxides were used as other materials (the first subcomponent: $V_2O_5$, the second subcomponent: $Al_2O_3$, the fourth subcomponent: $(Ba_{0.6}Ca_{0.4})SiO_3$ (described as BCG in tables)). Note that $(Ba_{0.6}Ca_{0.4})SiO_3$ was produced by performing wet mixing on $BaCO_3$, $CaCO_3$ and $SiO_2$ by a ball mill for 16 hours, drying, then, firing at 1000 to 1300° C. in the air and further performing wet grinding by a ball mill for 100 hours.

Next, the starting materials for producing the main component material and the first to fourth subcomponent materials were weighed, so that a composition after firing becomes the blending ratios shown in respective samples in each table, mixed and dried to obtain powder before preliminary firing.

Next, the powder before preliminary firing was preliminarily fired. A preliminary firing condition was as below. The temperature rising rate: 300° C./hour, the holding temperature: 1000 to 1300° C., the temperature holding time: 2 hours and the atmosphere: in the air.

Next, materials obtained by the preliminary firing were pulverized by an alumina roll, so that preliminarily fired powder (dielectric ceramic composition material) was obtained.

Next, the obtained dielectric ceramic composition material was mixed with an acrylic resin, ethyl acetate, mineral sprit and acetone by a ball mill to be a paste, so that a dielectric layer paste was obtained.

Ni particles having an average particle diameter of 0.1 to 0.8 µm, an organic vehicle and butyl carbitol were kneaded by triple-roll to be a paste, so that an internal electrode layer paste was obtained.

Cu particles having an average particle diameter of 0.5 µm, an organic vehicle and butyl carbitol were kneaded to be a paste, so that an external electrode paste was obtained.

Production of Green Chip

Next, a green sheet having a thickness of 6 µm was formed by using the dielectric layer paste on a PET film, and the internal electrode layer paste was printed thereon, then, the green sheet was released from the PET film.

Next, the green sheets and protective green sheets (on which the internal electrode layer paste was not printed) were stacked and bonded with pressure, so that a green chip was obtained. The number of stacked sheets having an internal electrode was 10.

Next, the green chip was cut to be a predetermined size, subjected to binder removal processing, firing and annealing (thermal treatment) to obtain a multilayer ceramic fired body. The binder removal processing was performed under a condition of the temperature rising rate of 15° C./hour, holding temperature of 280° C., and holding time of 8 hours in the air atmosphere. Also, the firing was performed under a condition of the temperature rising rate of 200° C./hour, holding temperature as shown in each table, holding time of 2 hours, and temperature cooling rate of 300° C./hour in an atmosphere of a wet mixed gas of $N_2+H_2$ (the oxygen partial pressure was adjusted to $2\times10^{-7}$ to $5\times10^{-4}$ Pa). The annealing was performed under a condition of the holding temperature of 900° C., temperature holding time of 9 hours, and temperature cooling rate of 300° C./hour in an atmosphere of a wet $N_2$ gas (the oxygen partial pressure was $3.54\times10^{-2}$ Pa).

Note that a wetter was used for wetting the atmosphere gas at firing and annealing.

Next, end surfaces of the multilayer ceramic fired body were polished by sand-blast, then, the external electrode paste was transferred to the end surfaces, and firing at 80° C. for 10 minutes in a wet $N_2+H_2$ atmosphere was performed to form external electrodes, so that a multilayer ceramic capacitor sample configured as shown in FIG. 1 was obtained. A size of each of the thus obtained samples was 3.2 mm×1.6 mm×0.6 mm, the number of dielectric layers sandwiched by internal electrode layers was 10, a thickness a~thereof was 4 μm, and a thickness of the internal electrode layer was 2 μm. Evaluation on characteristics below was made on each sample.

Specific Permittivity (ε), Dielectric Loss (tan δ) and Specific Resistance (ρ)

A capacitance and dielectric loss (tan δ, the unit is %) were measured on each capacitor sample under a condition at a reference temperature of 25° C., frequency of 1 MHz, and input signal level (measurement voltage) of 1 Vrms by a digital LCR meter (4274A made by YHP). All samples exhibited a preferable value of 0.01% or less in the tan δ. A specific permittivity (ε, no unit) was calculated from the obtained capacitance, an electrode size and distance between electrodes of each capacitor sample. The specific resistance (ρ, the unit is Ωcm) was measured after applying DC 50V at 25° C. for 60 seconds by using an insulation-resistance tester (R8340A made by Advantest Corporation). The results are shown in each table. In evaluation, the specific permittivity ε is a significant characteristic for producing a compact capacitor with a high permittivity, and 45 or higher was considered preferable. Each value of the specific resistance ρ and dielectric loss tan δ was obtained from an average value of measured values by using capacitor samples by the number n=10.

High Temperature Load Lifetime (Accelerated Lifetime of Insulation Resistance)

A high temperature load lifetime was measured on each capacitor sample by keeping the capacitor samples in a state of being applied with a direct current voltage of 50V/μm at 200° C. The high temperature load lifetime was measured on 10 capacitor samples and evaluated by measuring an average lifetime. The results are shown in each table. In evaluation, the high temperature load lifetime becomes particularly significant when making the dielectric layers thin, and time until the resistance declines by one digit from starting the application was defined as the lifetime.

Temperature Characteristic of Capacitance

In each capacitor sample, a capacitance at a voltage of 1 kHz and 1V was measured by using an LCR meter and examined whether a capacitance change rate with respect to a temperature satisfies −3000 to 0 ppm/° C. in a temperature range of 20 to 85° C. when assuming that the reference temperature is 20° C. As a result, all samples were confirmed to be able to satisfy it.

Note that adding quantities of the first subcomponent shown in each table are the number of moles in terms of $V_2O_5$, adding quantities of the second subcomponent are the number of moles in terms of $Al_2O_3$, the numbers of moles of the third and fourth subcomponents are the numbers of moles in terms of oxides, and all are the number of moles with respect to 100 moles of the main component in the final composition. In values of specific resistance (ρ) in each table, "mE+n" means "m×10$^{+n}$".

Table 1

TABLE 1

| Sample No. | | First Subcomponent mole | Second Subcomponent mole | Firing Temperature ° C. | Specific Resistance Ω · cm | High Temperature Load Lifetime h | ε |
|---|---|---|---|---|---|---|---|
| 1 | Comparative Example | 0 | 0 | 1360 | 9.6E+13 | 0.2 | 53 |
| 2 | Comparative Example | 0 | 0.3 | 1300 | 1.6E+13 | 1 | 52 |
| 3 | Comparative Example | 0.2 | 0 | 1340 | 1.8E+14 | 288 | 53 |
| 4 | Example | 0.2 | 0.01 | 1300 | 2.2E+14 | 1043 | 53 |
| 5 | Example | 0.2 | 0.05 | 1295 | 2.5E+14 | 1197 | 54 |
| 6 | Example | 0.2 | 0.1 | 1290 | 2.2E+14 | 1201 | 55 |
| 7 | Example | 0.2 | 0.5 | 1285 | 3.5E+14 | 1240 | 52 |
| 8 | Example | 0.2 | 1 | 1280 | 4.4E+14 | 1299 | 53 |
| 9 | Example | 0.2 | 5 | 1270 | 3.8E+14 | 1287 | 53 |
| 10 | Example | 0.2 | 10 | 1280 | 2.1E+14 | 1181 | 50 |
| 11 | Comparative Example | 0.2 | 15 | 1320 | 1.0E+14 | 446 | 37 |
| 12 | Example | 0.01 | 0.01 | 1300 | 4.2E+13 | 1012 | 54 |
| 13 | Example | 5 | 0.01 | 1280 | 7.7E+12 | 1222 | 53 |
| 14 | Example | 0.01 | 0.3 | 1290 | 2.4E+14 | 1154 | 53 |
| 15 | Example | 0.2 | 0.3 | 1280 | 3.9E+14 | 1293 | 55 |
| 16 | Example | 1 | 0.3 | 1275 | 7.2E+14 | 1351 | 54 |
| 17 | Example | 5 | 0.3 | 1265 | 8.9E+12 | 1399 | 52 |
| 18 | Comparative Example | 7 | 0.3 | 1265 | 7.5E+10 | 698 | 53 |
| 19 | Example | 0.01 | 10 | 1275 | 9.9E+13 | 1235 | 51 |
| 20 | Example | 5 | 10 | 1300 | 9.1E+12 | 1032 | 52 |

Note that composition formula of main component = $\{(Ca_{1-x}Sr_x)O\}_m \cdot (Zr_{1-y}Ti_y)O_2$
in main component, m = 1, x = 0.4, y = 0.2, composition = $(Ca_{0.6}Sr_{0.4})O \cdot (Zr_{0.8}Ti_{0.2})O_2$
first subcomponent = $V_2O_5$
second subcomponent = $Al_2O_3$
in third subcomponent, element = Mn, the number of moles = 0.7 mole
in fourth subcomponent, element = BCG, the number of moles = 2 moles

TABLE 2

| Sample No. | | Third Subcomponent mole | Fourth Subcomponent mole | Firing Temperature °C. | Specific Resistance Ω·cm | High Temperature Load Lifetime h | ε |
|---|---|---|---|---|---|---|---|
| 21 | Example | 0 | 2 | 1320 | 2.2E+12 | 882 | 53 |
| 22 | Example | 0.1 | 2 | 1300 | 7.3E+13 | 1082 | 52 |
| 23 | Example | 0.5 | 2 | 1290 | 2.3E+14 | 1249 | 54 |
| 24 | Example | 0.9 | 2 | 1285 | 2.9E+14 | 1265 | 53 |
| 25 | Example | 4 | 2 | 1275 | 6.1E+13 | 1005 | 51 |
| 26 | Example | 5 | 2 | 1270 | 3.5E+12 | 460 | 52 |
| 27 | Example | 0.7 | 0 | 1400 | 9.0E+13 | 1002 | 55 |
| 28 | Example | 0.7 | 0.1 | 1350 | 1.1E+14 | 1058 | 54 |
| 29 | Example | 0.7 | 1 | 1300 | 1.4E+14 | 1214 | 53 |
| 30 | Example | 0.7 | 3 | 1270 | 3.1E+14 | 1277 | 51 |
| 31 | Example | 0.7 | 15 | 1210 | 3.8E+13 | 1033 | 48 |
| 32 | Example | 0.7 | 20 | 1200 | 1.7E+12 | 734 | 31 |
| 33 | Example | 0 | 0 | 1420 | 1.1E+12 | 873 | 55 |

Note that composition formula of main component = $\{(Ca_{1-x}Sr_x)O\}_m \cdot (Zr_{1-y}Ti_y)O_2$
in main component, m = 1, x = 0.4, y = 0.2, composition = $(Ca_{0.6}Sr_{0.4})O \cdot (Zr_{0.8}Ti_{0.2})O_2$
first subcomponent = $V_2O_5$, the number of moles = 0.2 mole
second subcomponent = $Al_2O_3$, the number of moles = 0.3 mole
in third subcomponent, element = Mn
in fourth subcomponent, element = BCG

TABLE 3

| Sample No. | | Main Component | | | | Firing Temperature °C. | Specific Resistance Ω·cm | High Temperature Load Lifetime h | ε |
|---|---|---|---|---|---|---|---|---|---|
| | | x | y | m | Composition | | | | |
| 34 | Example | 0 | 0 | 1 | $CaZrO_3$ | 1400 | 6.9E+14 | 2149 | 28 |
| 35 | Example | 1 | 0 | 1 | $SrZrO_3$ | 1360 | 4.7E+14 | 1933 | 30 |
| 36 | Example | 0.3 | 0.1 | 1 | $(Ca_{0.7}Sr_{0.3})O \cdot (Zr_{0.9}Ti_{0.1})O_2$ | 1320 | 4.4E+14 | 1427 | 31 |
| 15 | Example | 0.4 | 0.2 | 1 | $(Ca_{0.6}Sr_{0.4})O \cdot (Zr_{0.8}Ti_{0.2})O_2$ | 1280 | 3.9E+14 | 1293 | 55 |
| 37 | Example | 0.3 | 0.3 | 1 | $(Ca_{0.7}Sr_{0.3})O \cdot (Zr_{0.7}Ti_{0.3})O_2$ | 1270 | 9.7E+13 | 1276 | 66 |
| 38 | Example | 0.7 | 0.3 | 1 | $(Ca_{0.3}Sr_{0.7})O \cdot (Zr_{0.7}Ti_{0.3})O_2$ | 1260 | 6.3E+13 | 1202 | 71 |
| 39 | Example | 0.3 | 0.7 | 1 | $(Ca_{0.7}Sr_{0.3})O \cdot (Zr_{0.3}Ti_{0.7})O_2$ | 1250 | 1.5E+13 | 1150 | 148 |
| 40 | Example | 0.7 | 0.7 | 1 | $(Ca_{0.3}Sr_{0.7})O \cdot (Zr_{0.3}Ti_{0.7})O_2$ | 1220 | 3.8E+12 | 1088 | 170 |
| 41 | Example | 0.3 | 0.8 | 1 | $(Ca_{0.7}Sr_{0.3})O \cdot (Zr_{0.2}Ti_{0.8})O_2$ | 1240 | 6.1E+12 | 1119 | 160 |
| 42 | Example | 0.3 | 0.9 | 1 | $(Ca_{0.7}Sr_{0.3})O \cdot (Zr_{0.1}Ti_{0.9})O_2$ | 1230 | 5.3E+12 | 1093 | 169 |
| 43 | Example | 0 | 1 | 1 | $CaTiO_3$ | 1210 | 2.6E+12 | 1044 | 172 |
| 44 | Example | 1 | 1 | 1 | $SrTiO_3$ | 1200 | 1.2E+12 | 1007 | 277 |

Note that first subcomponent = $V_2O_5$, the number of moles = 0.2 mole
second subcomponent = $Al_2O_3$, the number of moles = 0.3 mole
in third subcomponent, element = Mn, the numberof moles = 0.7 mole
in fourth subcomponent = BCG, the numberof moles = 2 moles As shown in Table 1, first, regarding with or without adding the first subcomponent and second subcomponent, when the first subcomponent is not included (sample numbers 1 and 2), the high temperature load lifetime is extremely short. Even when the first subcomponent is included, if the second subcomponent is not included (sample number 3), the high temperature load lifetime becomes insufficient. On the other hand, when both of the first subcomponent and second subcomponent are included (sample numbers 4 to 20), the high temperature load lifetime is improved.

Also, when an adding quantity of V is too much (sample number 18) or an adding quantity of Al is too much (sample number 11) with respect to adding quantities of the first subcomponent and second subcomponent, a wide improvement of the high temperature load lifetime cannot be obtained comparing with the case of the sample number 3, wherein the second subcomponent is not included but the first subcomponent is included by a suitable quantity (the lifetime is improved only by 1.5 to 2.5 times or so comparing with that in the sample number 3). Note that when an adding quantity of Al is too much (sample number 11), a value of ε tends to decline. On the other hand, in the sample numbers 4 to 10, 12 to 17, 19 and 20, wherein the first subcomponent and second subcomponent are included by predetermined amounts, it was confirmed that a dielectric ceramic composition having a sufficient specific permittivity and specific resistance, not reduced even by being fired in a reducing atmosphere, and having excellent reduction resistance, wherein nickel as the internal electrode material is not oxidized, was able to be obtained. Also, it was confirmed that the capacity-temperature characteristic was excellent, moreover, low frequency dielectric dispersant could be suppressed (tan δ at 100 Hz and 160° C. was small), and the high temperature load lifetime (accelerated lifetime of insulation resistance) could be widely improved (for example, about four times as much as that in the sample number 3 or more).

As shown in Table 2, regarding with or without including the third subcomponent and the fourth subcomponent, when the third subcomponent is not included (sample number 21), it is liable that the improving rate of the high temperature load lifetime becomes small. Even when the third subcomponent is included, if the fourth subcomponent is not included (sample number 27), it is liable that the high temperature load lifetime cannot be sufficiently improved when not fired at a high temperature as 1400° C. When neither of the third subcomponent nor the fourth subcomponent is included (sample number 33), it is liable that the improving rate of the high temperature load lifetime becomes small. However, since all of sample numbers 21, 27 and 33 include the first subcomponent and the second subcomponent by suitable amounts, the high temperature load lifetime is improved comparing with that in the case where at least one of the first subcomponent and the second subcomponent is not included as in the sample numbers 1 to 3 in Table 1.

Also, regarding contents of the third subcomponent and fourth subcomponent, when an adding quantity of Mn is too much (sample number 26) and when a content of BCG is too much (sample number 32), it is liable that the improving rate of the high temperature load lifetime becomes small. On the other hand, in sample numbers 22 to 25 and 28 to 31, wherein the third subcomponent and the fourth subcomponent are included by predetermined amounts, it was confirmed that the high temperature load lifetime (accelerated lifetime of insulation resistance) could be widely improved (for example, two times as much as that in sample number 26 or more). Note that when an adding quantity of BCG is too much (sample number 32), a value of $\epsilon$ tends to decline.

As shown in Table 3, even when "m", "x" and "y" in the main component are changed, it was confirmed that the high temperature load lifetime (accelerated lifetime of insulation resistance) could be widely improved. Particularly, it was confirmed that when "y" is in a range of $0.1 \leq y \leq 0.8$, the effect of improving the high temperature load lifetime was high (refer to sample numbers 36 to 41 and sample number 15).

INDUSTRIAL APPLICABILITY

According to the present invention, it is possible to provide a reduction-resistant dielectric ceramic composition having an excellent low frequency dielectric characteristic and a furthermore improved accelerated lifetime of insulation resistance, and an electronic device, such as a chip capacitor, wherein the dielectric ceramic composition is included and the reliability is furthermore improved.

The invention claimed is:

1. A dielectric ceramic composition, comprising:
a main component including a dielectric oxide expressed by a composition formula of $\{(Ca_{1-x}Sr_x)O\}_m \cdot (Zr_{1-y}Ti_y)O_2$, wherein "m", "x" and "y" indicating composition mole ratios in the composition formula are in relationships of $0.8 \leq m \leq 1.3$, $0 \leq x \leq 1.00$ and $0.1 \leq y \leq 0.8$;
a first subcomponent including a V oxide; and
a second subcomponent including an Al oxide;
wherein
ratios of respective components with respect to 100 moles of said main component are the first subcomponent: 0 mole<first subcomponent<7 moles (wherein the value is a V oxide value in terms of $V_2O_5$); and
the second subcomponent: 0 mole<second subcomponent<15 moles (wherein the value is an Al oxide value in terms of $Al_2O_3$).

2. The dielectric ceramic composition as set forth in claim 1, comprising a third subcomponent including a Mn oxide, wherein a ratio of said third subcomponent with respect to 100 moles of said main component is 0 mole<third subcomponent<5 moles in terms of a Mn element in the oxide.

3. The dielectric ceramic composition as set forth in claim 2, comprising a fourth subcomponent including $SiO_2$ as a main component and at least one kind selected from MO (note that M is at least one kind of element selected from Ba, Ca, Sr and Mg), $Li_2O$ and $B_2O_3$, wherein a ratio of said fourth subcomponent with respect to 100 moles of said main component is 0 mole<fourth subcomponent<20 moles in terms of the oxide.

4. The dielectric ceramic composition as set forth in claim 2, including a fourth subcomponent including a composite oxide expressed by a composition formula of $\{(Ba_z, Ca_{1-z})O\}_v \cdot SiO_2$, wherein "z" and "v" indicating composition mole ratios in the composition formula are in relationships of $0 \leq z \leq 1$ and $0.5 \leq v \leq 4.0$;
wherein a ratio of said fourth subcomponent with respect to 100 moles of said main component is 0 mole<fourth subcomponent<20 moles in terms of the oxide.

5. A dielectric ceramic composition, comprising:
a main component including a dielectric oxide expressed by a composition formula of $\{(Ca_{1-x}Sr_x)O\}_m \cdot (Zr_{1-y}Ti_y)O_2$, wherein "m", "x" and "y" indicating composition mole ratios in the composition formula are in relationships of $0.8 \leq m \leq 1.3$, $0 \leq x \leq 1.00$ and $0.1 \leq y \leq 0.8$;
a first subcomponent including a V oxide;
a second subcomponent including an Al oxide;
a third subcomponent including a Mn oxide; and
a fourth subcomponent including a composite oxide expressed by a composition formula of $\{(Ba_z, Ca_{1-z})O\}_v \cdot SiO_2$, wherein "z" and "v" indicating composition mole ratios in the composition formula are in relationships of $0 \leq z \leq 1$ and $0.5 \leq v \leq 4.0$;
wherein ratios of respective components with respect to 100 moles of said main component are:
the first subcomponent: 0 mole<first subcomponent<7 moles (wherein the value is a V oxide value in terms of $V_2O_5$);
the second subcomponent: 0 mole<second subcomponent<15 moles (wherein the
value is an Al oxide value in terms of $Al_2O_3$);
the third subcomponent: 0 mole<third subcomponent<5 moles (wherein the value is in terms of a Mn element in the oxide); and
the fourth subcomponent: 0 mole<fourth subcomponent<20 moles (wherein the
value is in terms of the composite oxide).

6. An electronic device comprising a dielectric layer wherein:
said dielectric layer is composed of a dielectric ceramic composition; and
the dielectric ceramic composition comprises:
a main component including a dielectric oxide expressed by a composition formula of $\{(Ca_{1-x}Sr_x)O\}_m \cdot (Zr_{1-y}Ti_y)O_2$, wherein "m", "x" and "y" indicating composition mole ratios in the composition formula are in relationships of $0.8 \leq m \leq 13.0 \leq x \leq 1.00$ and $0.1 \leq y \leq 0.8$;
a first subcomponent including a V oxide;
a second subcomponent including an Al oxide;
a third subcomponent including a Mn oxide; and
a fourth subcomponent including a composite oxide expressed by a composition formula of $\{(Ba_z, Ca_{1-z})O\}_v \cdot SiO_2$, wherein "z" and "v" indicating composition mole ratios in the composition formula are in relationships of $0 \leq z \leq 1$ and $0.5 \leq v \leq 4.0$;
wherein ratios of respective components with respect to 100 moles of said main component are:
the first subcomponent: 0 mole<first subcomponent<7 moles (wherein the value is a V oxide value in terms of $V_2O_5$);

the second sub component: 0 mole<second subcomponent<15 moles (wherein the value is an Al oxide value in terms of $Al_2O_3$);

the third subcomponent: 0 mole<third subcomponent<5 moles (wherein the value is in terms of a Mn element in the oxide); and the fourth subcomponent: 0 mole<fourth subcomponent<20 moles (wherein the value is in terms of the composite oxide).

7. A multilayer ceramic capacitor comprising an element body, wherein dielectric layers composed of a dielectric ceramic composition and internal electrode layers including a base metal as a main component are alternately stacked, wherein:

said dielectric ceramic composition comprises:

a main component including a dielectric oxide expressed by a composition formula of $\{(Ca_{1-x}Sr_x)O\}_m \cdot (Zr_{1-y}Ti_y)O_2$, wherein "m", "x" and "y" indicating composition mole ratios in the composition formula are in relationships of $0.8 \leq m \leq 1.3$, $0 \leq x \leq 1.00$ and $0.1 \leq y \leq 0.8$;

a first subcomponent including a V oxide;

a second subcomponent including an Al oxide;

a third subcomponent including a Mn oxide; and a fourth subcomponent including a composite oxide expressed by a composition formula of $\{(Ba_z, Ca_{1-z})O\}_v \, SiO_2$, wherein "z" and "v" indicating composition mole ratios in the composition formula are in relationships of $0 \leq z \leq 1$ and $0.5 \leq v \leq 4.0$;

wherein ratios of respective components with respect to 100 moles of said main component are:

the first subcomponent: 0 mole<first subcomponent<7 moles (wherein the value is a V oxide value in terms of $V_2O_5$);

the second subcomponent: 0 mole<second subcomponent<15 moles (wherein the value is an Al oxide value in terms of $Al_2O_3$);

the third subcomponent: 0 mole<third subcomponent<5 moles (wherein the value is in terms of a Mn element in the oxide); and the fourth subcomponent: 0 mole<fourth subcomponent<20 moles (wherein the value is in terms of the composite oxide).

* * * * *